(12) United States Patent
Lopotko et al.

(10) Patent No.: US 11,677,249 B2
(45) Date of Patent: Jun. 13, 2023

(54) FOLDABLE WATCH CHARGING ADAPTER

(71) Applicant: Xentris Wireless LLC, Addison, IL (US)

(72) Inventors: Mark Lopotko, Lisle, IL (US); Christopher Whetstone, Pingree Grove, IL (US)

(73) Assignee: Xentris Wireless LLC, Addison, IL (US)

( * ) Notice: Subject to any disclaimer, the term of this patent is extended or adjusted under 35 U.S.C. 154(b) by 421 days.

(21) Appl. No.: 16/805,085

(22) Filed: Feb. 28, 2020

(65) Prior Publication Data

US 2020/0280199 A1     Sep. 3, 2020

Related U.S. Application Data

(60) Provisional application No. 62/812,927, filed on Mar. 1, 2019.

(51) Int. Cl.
*H02J 50/10* (2016.01)
*H02J 7/00* (2006.01)
(Continued)

(52) U.S. Cl.
CPC .......... *H02J 7/0044* (2013.01); *H01R 31/065* (2013.01); *H02J 50/10* (2016.02); *G06F 1/163* (2013.01)

(58) Field of Classification Search
CPC .......... H02J 50/10; H02J 7/0042; H02J 50/90; H02J 7/025; H02J 50/005; H02J 50/80; H02J 7/02; H02J 7/00034; H02J 7/0044; H02J 50/50; H02J 50/70; H02J 7/0045; H02J 50/12; H02J 7/0021; H02J 7/0047; H02J 7/342; H02J 2310/22; H02J 50/001; H02J 50/402; H02J 7/00; H02J 7/00032; H02J 7/007; H02J 50/60; H02J 7/00045; H02J 50/20; H04L 67/10; H04L 67/12; H04B 5/0081; H04B 5/0037;
(Continued)

(56) References Cited

U.S. PATENT DOCUMENTS 9,901,147 B1 * 2/2018 Karanikos .............. B65D 25/10
2011/0018360 A1    1/2011 Baaarman et al.
(Continued)

OTHER PUBLICATIONS

Jong Han Jung; International Search Report, counterpart PCT Application No. PCT/US2020/020553, dated Jun. 26, 2020, ISA/KR—KIPO, Daejeon, Republic of Korea.
(Continued)

*Primary Examiner* — Binh C Tat
(74) *Attorney, Agent, or Firm* — Brian M. Holt (57) ABSTRACT

A foldable watch charging adapter has a watch charging housing provided with an induction charge surface. The watch charging housing is coupled to a charge end of a charge arm. A joint rotatably couples a pivot end of the charge arm to a joint end of a connector arm; and an electrical connector is provided at a connector end of the connector arm. An angular interconnection orientation of the electrical connector may be adjusted by rotating the connector arm with respect to the charge arm about the joint. Further, a connection interface adapter may be included to increase the range of connection interfaces that may be utilized.

13 Claims, 7 Drawing Sheets

(51) Int. Cl.
*H01R 31/06* (2006.01)
*G06F 1/16* (2006.01)

(58) Field of Classification Search
CPC .. H04B 5/0025; H04B 1/3888; H04B 5/0031; H04B 5/0056; H04B 1/1607; H04B 1/3883
USPC .................................................. 320/106–115
See application file for complete search history.

(56) References Cited

U.S. PATENT DOCUMENTS

| | | | |
|---|---|---|---|
| 2016/0062319 A1* | 3/2016 | Kim ....................... | H02J 50/12 |
| | | | 368/204 |
| 2017/0126048 A1 | 5/2017 | Wang | |
| 2018/0259914 A1* | 9/2018 | Chae ...................... | G04G 17/08 |
| 2018/0360251 A1 | 12/2018 | Rosenblum et al. | |

OTHER PUBLICATIONS

Yukari Nakamura; International Preliminary Report on Patentability for PCT/US2020/020553, dated Feb. 29, 2020, Korean Intellectual Property Office, Daejeon, Republic of Korea.

* cited by examiner

FOLDABLE WATCH CHARGING ADAPTER

CROSS-REFERENCE TO RELATED APPLICATION

This application claims the benefit of U.S. Provisional Patent Application No. 62/812,927 filed on 1 Mar. 2019, hereby incorporated by reference in its entirety.

BACKGROUND

Field of the Invention

This invention relates to a wireless watch charging adapter. More particularly, the invention relates to a wireless watch charging adapter which folds for ease of compact transport and/or to align an electrical connector of the wireless watch charging adapter with power ports provided in any of a range of angular orientations.

Description of Related Art

Increasing operating speed, functionality and operating periods of modern consumer electronics devices requires a corresponding increase in power consumption. A significant factor in consumer satisfaction with consumer electronics devices is ease of recharging the battery of such consumer electronics devices. The overall size of a smart watch is a particularly important factor of their commercial success. Therefore, the battery size of typical smart watches is limited, often resulting in a need to recharge a heavily used smart watch more than once a day.

Wireless magnetic inductive charging technologies enable recharging of suitably configured electronics devices without requiring mechanical interconnection via an electrical connector, significantly simplifying recharging procedures and enabling simplified/improved environmental sealing of the electronic devices.

Typical smart watch wireless inductive chargers, for example as provided with each smart watch by the manufacturer typically include an inductive power transfer cradle, a Universal Serial Bus (USB) cable and a USB adapter for converting between USB, Type A (USB-A) and USB, Type C (USB-C). The flexible USB cable and adapter enables connection with USB ports of charger wall adapters, laptop and desktop computers that may have their USB ports in vertical or horizontal orientations and with respect to, for example, USB-A also left or right facing angular orientation. However, carrying a tangled USB cable, USB adapter and the inductive power transfer cradle creates an additional burden upon the user that frustrates the ease of use concept of the smart watch being readily available/easy to keep with the user, throughout the day.

Therefore, an object of the invention is to provide a watch charging adapter solution that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

As shown in FIGS. 1-13, a foldable wireless charging adapter 2 is configurable from a compact easy to transport form factor into a wide range of charge configurations to match the orientation of an available power port such as, for example, a USB-A or USB-C.

Figure 1:
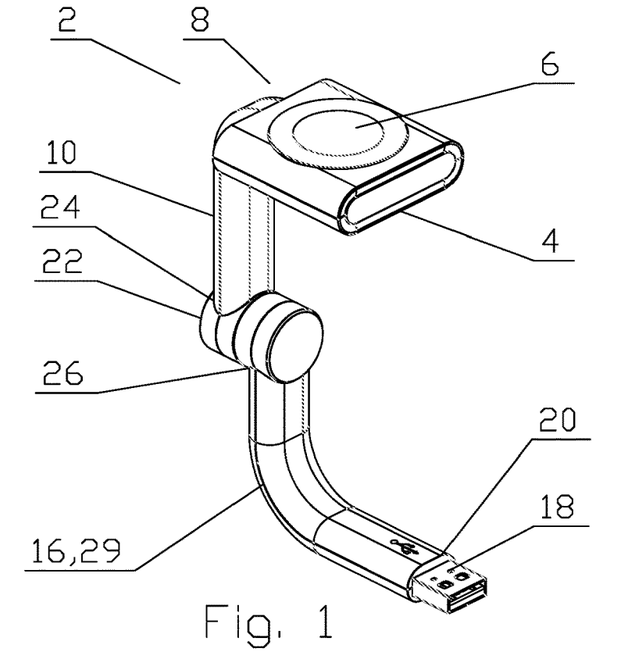
FIG. 1 is an exemplary front isometric view of a first embodiment the foldable watch charger adapter in a 180° horizontal interconnection orientation.
Figure 2:
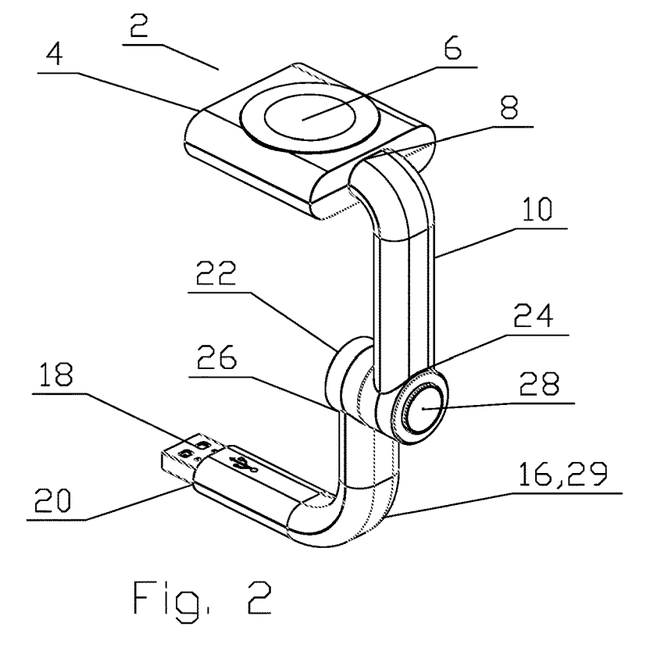
FIG. 2 is a back isometric view of the foldable watch charger adapter of FIG. 1.
Figure 3:
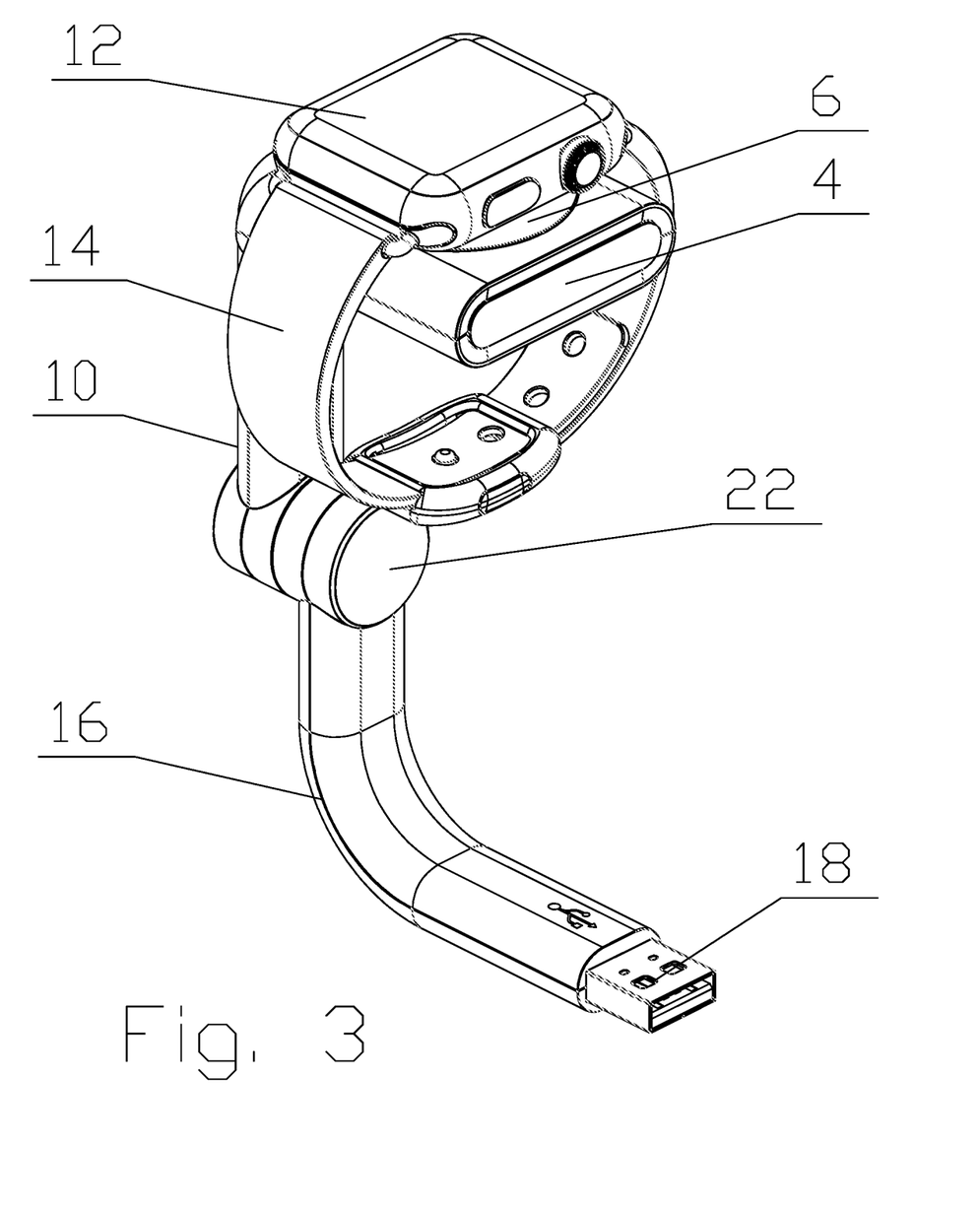
FIG. 3 is another view of the first embodiment, with an exemplary smartwatch in position for wireless charging.

As best shown in FIGS. 1 and 2, the foldable wireless charging adapter 2 includes a watch charging housing 4 with an induction charge surface 6 at a charge end 8 of a charge arm 10. The watch charging housing 4 projects inward from the charge arm 10 allowing a smartwatch 12 to be seated upon the induction charge surface 6 without the watchband 14 of the smart watch 12 interfering with the remainder of the foldable wireless charging adapter 2 (see FIG. 3). A connector arm 16 is provided with an electrical connector 18 at a connector end 20. The electrical connector 18 may be, for example, a male USB-A or USB-C connector.

The charge arm 10 and the connector arm 16 are rotatably connected to one another at a joint 22 between a pivot end 24 of the charge arm 10 and a joint end 26 of the connector arm 16. The electrical connector 18 extends inward from the connector arm 10 farther than the watch charging housing 4, so that the watch charging housing 4 does not interfere with a plane of an electrical port the foldable wireless charging adapter 2 may be connected to, via the electrical connector 18, such as a wall mounted electrical port. The extension from the connector arm 16 to the electrical connector 18 may be partially via a bend 29 provided in the connector arm 16 which also aligns the electrical connector 18 with an insertion axis of the electrical connector that is normal to a rotation plane of the joint 22.

Electrical connectors typically require rotational alignment between the respective mating portions. By rotating via the joint 22 (the connector arm 16 with respect to the charge arm 10), the orientation of the electrical connector 18 may be adjusted to mate with the orientation of an available power port (not shown). For example, it is common to have USB-A or USB-C port/outlet provided in both vertical and horizontal orientations. Further, USB-A ports may be provided right or left facing.

Figure 4:
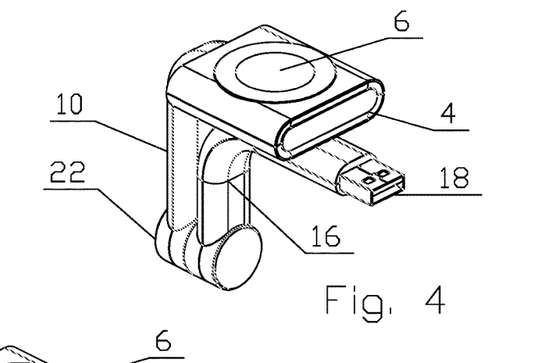
FIG. 4 is a front isometric view of the first embodiment in storage position.
Figure 5:
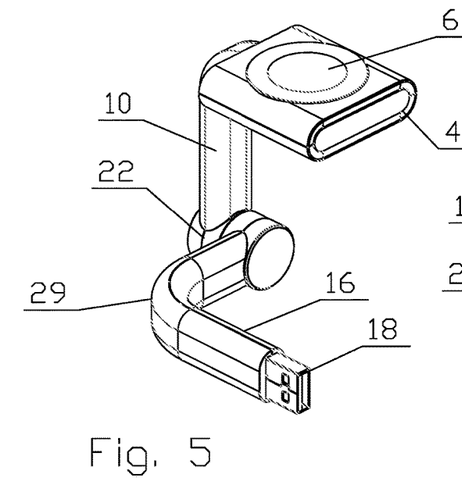
FIG. 5 is a front isometric view of the first embodiment in a 90° vertical interconnection orientation.
Figure 6:
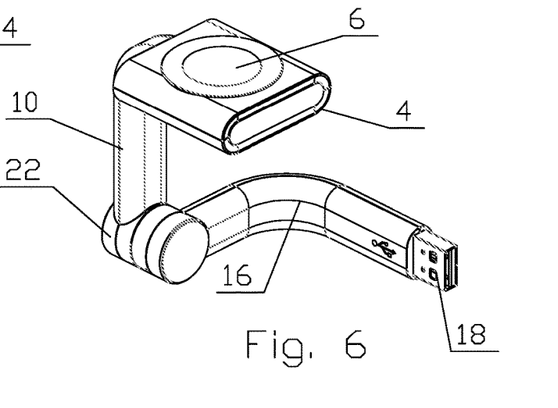
FIG. 6 is a front isometric view of the first embodiment in a 270° vertical interconnection orientation.
Figure 7:
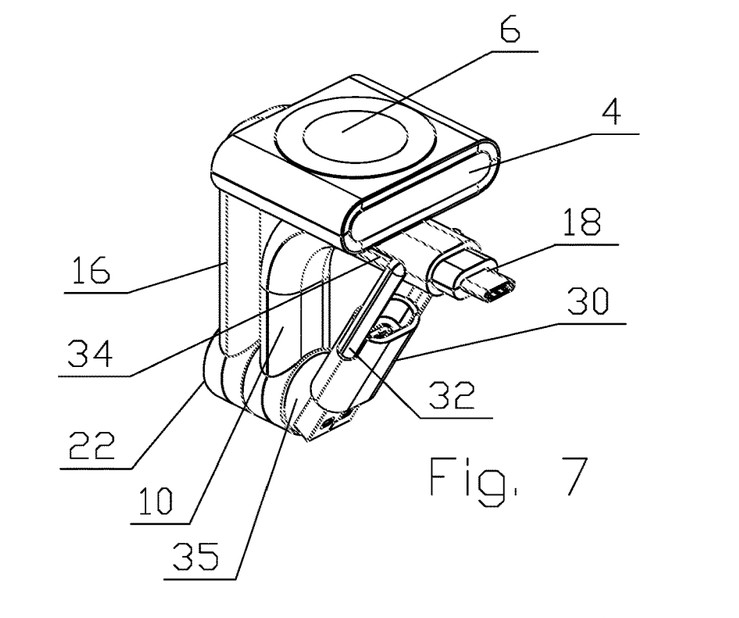
FIG. 7 is an exemplary front isometric view of a second embodiment of the foldable watch charger adapter in a storage position.

The joint end 26 of the connector arm 16 is rotatably attached to the pivot end 24 of the charge arm 10 via the joint 22. The joint 22 may be provided with a joint release button 28 (See FIG. 2) on an outer side which while actuated allows rotation between the connector arm 16 and the charge arm 10 through an angular range of, for example, 270°, but which when released locks the joint 22 and thus the selected orientation of connector and charge arms 16, 10. Thereby, the orientation of the electrical connector may be adjusted, while the orientation of the watch charging housing 4 and the induction charge surface 6 remains oriented for receiving a smart watch 12 or the like for wireless charging thereon. Joint 22 angles may be referenced from, for example, a zero angle or storage position, as shown in FIG. 4, wherein the connector arm 16 and the charge arm 10 are parallel to one another and the electrical connector 18 is proximate the watch charging housing 4. For example, while FIGS. 1-3 demonstrate the foldable wireless charging adapter 2 adjusted for use with a horizontal power connector port (a 180 degree angle at the joint 22), FIGS. 5 and 6 demonstrate the joint 22 provided at 90 and 270 degrees for use with right and left facing vertical power connector port orientations.

Figure 8:
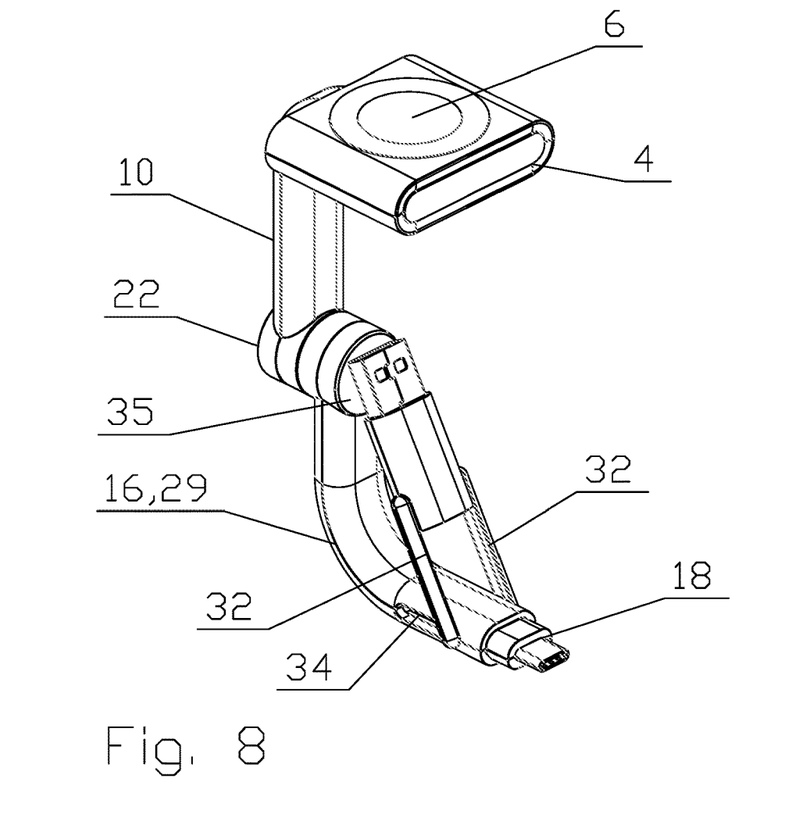
FIG. 8 is a front isometric view of the second embodiment in a one a 90° horizontal interconnection orientation.
Figure 9:
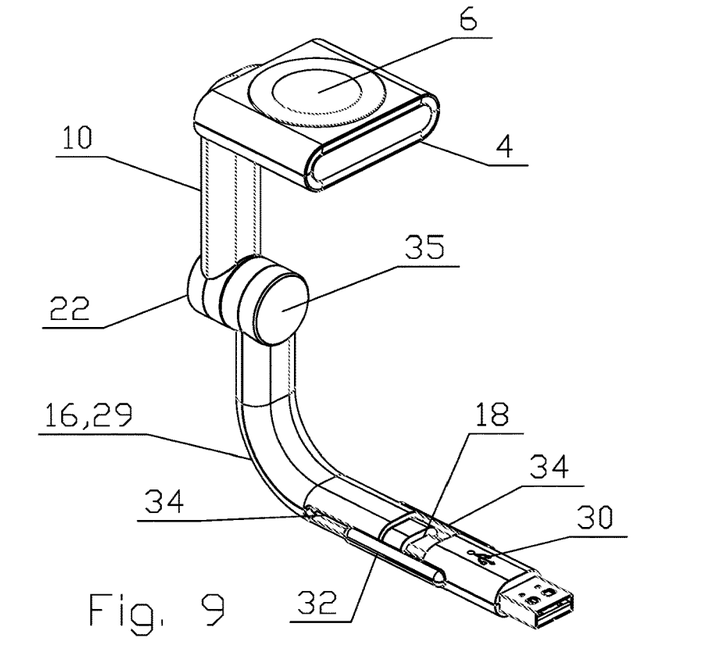
FIG. 9 is a front isometric view of the second embodiment in a 180° horizontal interconnection orientation, showing the interface adapter positioned for interconnection with the electrical connector.
Figure 10:
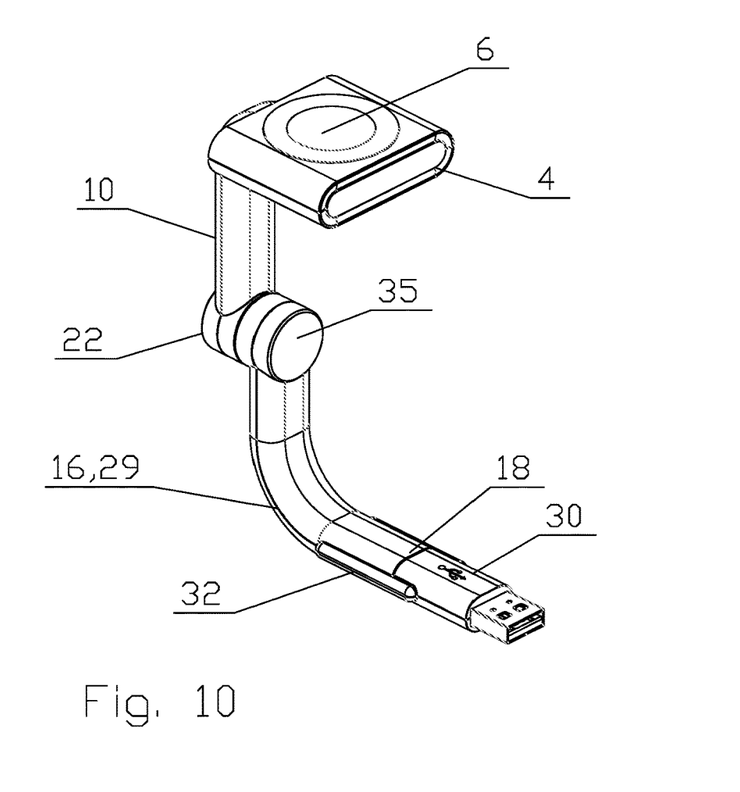
FIG. 10 is a front isometric view of the second embodiment in 180° horizontal intersection orientation, with the interface adapter interconnected with the electrical connector.
Figure 11:
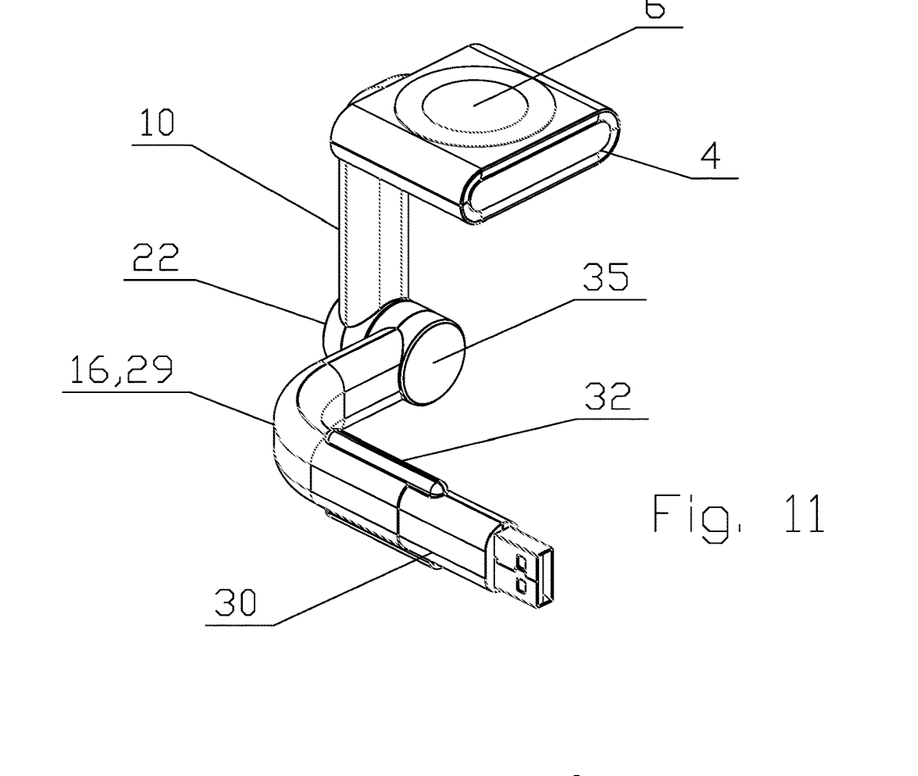
FIG. 11 is a front isometric view of the second embodiment in a 90° vertical interconnection orientation, with the interface adapter interconnected with the electrical connector.
Figure 12:
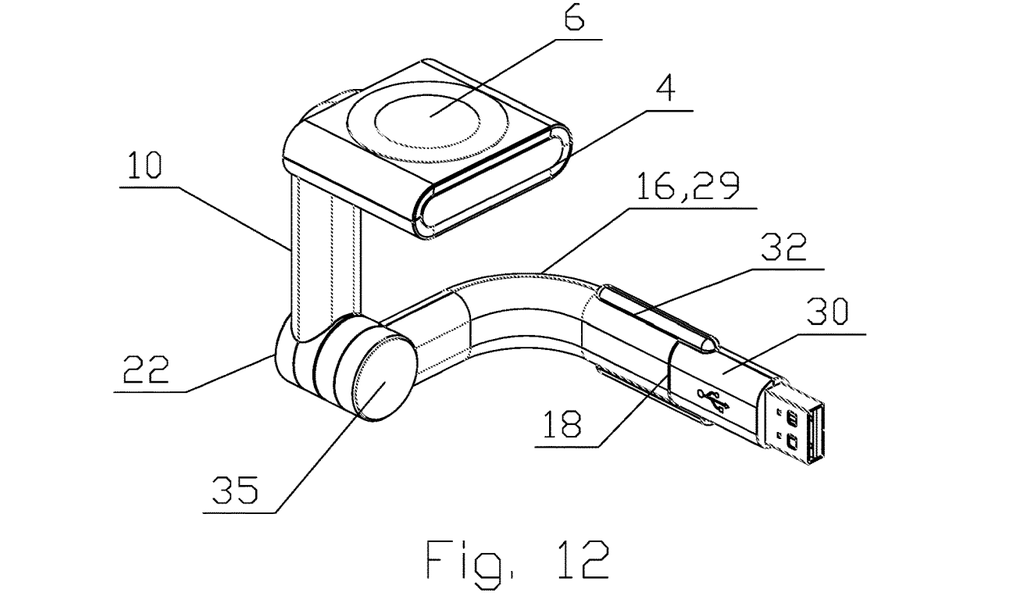
FIG. 12 is a front isometric view of the second demotic embodiment in a 270° vertical interconnection orientation, with the interface adapter interconnected with the electrical connector.

For further ease of use/versatility, the foldable wireless charging adapter 2 may be provided with an interface adapter 30 which changes the interconnection interface of the electrical connector 18 to an alternative interconnection interface, expanding the range of power ports the foldable wireless charging adapter 2 may utilize. For example, FIGS. 7-13 demonstrate an embodiment where the electrical connector 18 is a USB-C and the interface adapter 30 is attachable thereto to convert the interconnection interface to USB-A. The interface adapter 30 may include coupling arms 32 that retain the interface adapter 30 upon the foldable wireless charging adapter 2; the coupling arms 32 seated within and moveable along corresponding slots 34 proximate the electrical connector 18 to allow the interface adapter 30 to slide onto and off of the electrical connector 18 (See FIGS. 9 and 10) for connection/disconnection along the insertion axis and when disconnected to pivot up and away there from. The inner side of the joint 22 may be provided with a magnet 35 to which the interface adapter 30 may be magnetically coupled, further securing the interface adapter 30 out of the way for compact storage/transport in the storage position (FIG. 7) or when it is the default electrical connector 18 interconnection interface that the foldable wireless charging adapter 2 is utilizing (FIG. 8).

Figure 13:
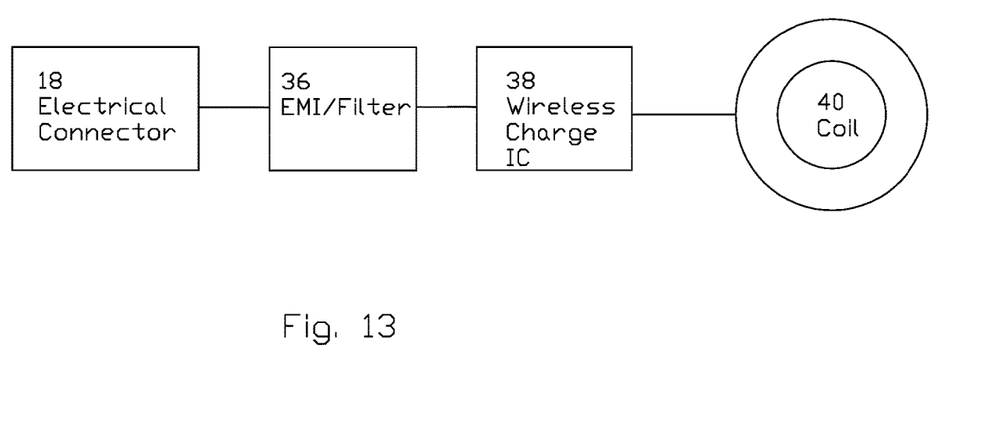
FIG. 13 is a schematic block diagram of electrical connections of an exemplary foldable watch charger adapter.

FIG. 13 demonstrates exemplary internal interconnections and circuitry of the foldable wireless charging adapter 2. The electrical connector 18 is electrically connected to an electromagnetic interference filter 36 and there through to a wireless charging integrated circuit 38 which drives a magnetic charge module including an induction coil 40 provided proximate the induction charge surface 6. Although the specific wireless charging integrated circuit and/or magnetic charge module/coil requirements may be different between, for example, ANDROID® and APPLE® electronic device family specific embodiments, in use a foldable wireless charging adapter 2 embodiment for one or the other is operable in essentially the same way. As such, further detail of specific electrical circuitry and uses thereof are well known in the art and as such are not presented herein.

Although the foldable wireless charging adapter 2 is demonstrated with respect to USB-C and/or USB-A electrical connector 18 connection interface embodiments, one skilled in the art will appreciate that any standard or proprietary port/connector interface providing suitable electrical power capacity may be utilized.

One skilled in the art will appreciate that the foldable wireless charging adapter 2 enables a user to configure the adapter for use with a wide range of, for example, USB ports—each of which may be encountered with a range of angular port orientations. This provides the user with significant ease-of-use benefits, in contrast to requiring a cradle, additional easy to tangle cable and/or loose adapter that may be difficult to store/keep track of. Further, the foldable wireless charging adapter 2 is provided as a single unit which folds into a single very compact arrangement for transport (see FIGS. 4 and 7). Thereby, a user is able to readily recharge/top off their electronic device, such as a smartwatch 12, via any of the many USB ports they may encounter throughout their day.

| Table of Parts | |
|---|---|
| 2 | Foldable wireless charging adapter |
| 4 | Watch charging housing |
| 6 | Induction charge surface |
| 8 | Charge end |
| 10 | Charge arm |
| 12 | Smart watch |
| 14 | Watchband |
| 16 | Connector Arm |
| 18 | Electrical connector |
| 20 | Connector end |
| 22 | Joint |
| 24 | Pivot end |
| 26 | Joint end |
| 28 | Joint release button |
| 29 | Bend |
| 30 | Interface adapter |
| 32 | Coupling arms |
| 34 | Slots |
| 35 | Magnet |
| 36 | Electromagnetic interference filter |
| 38 | Wireless charging integrated circuit |
| 40 | Coil |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A foldable watch charging adapter, comprising:
   a watch charging housing provided with an induction charge surface;
   the watch charging housing coupled to a charge end of a charge arm;
   a joint rotatably coupling a pivot end of the charge arm to a joint end of a connector arm;
   an electrical connector provided at a connector end of the connector arm, whereby an angular interconnection orientation of the electrical connector may be adjusted by rotating the connector arm with respect to the charge arm about the joint;
   a connection interface adapter configured to seat upon the electrical connector along an insertion axis; and
   a retainer arrangement that retains the connection interface adapter upon the electrical connector, the retainer arrangement enabling interconnection and disconnection of the connection interface adapter with the electrical connector.

2. The foldable watch charging adapter of claim 1, wherein the watch charging housing projects inward from the charge end; and
   The electrical connector projects inward from the connector end of the connector arm farther than the watch charging housing.

3. The foldable watch charging adapter of claim 1, wherein the connector arm has a bend; the bend aligning an insertion axis of the electrical connector normal to a rotation plane of the joint.

4. The foldable watch charging adapter of claim 1, further including a pivot button on the joint; depression of the pivot button operative to enable rotation of the connector arm with respect to the charge arm about the joint.

5. The foldable watch charging adapter of claim 1, wherein the rotation of the connector arm with respect to the charge arm has an angular range of 270 degrees or more.

6. The foldable watch charging adapter of claim 1, wherein the electrical connector has a Universal Serial Bus, Type A interface.

7. The foldable watch charging adapter of claim 1, wherein the retainer arrangement includes retaining arms pivotally attached to the connection interface adapter; slidable ends of the retaining arms are seated within retention slots which are aligned parallel with the insertion axis; whereby the connection interface adapter may be alternatively aligned for interconnection with the electrical connector for interconnection along the insertion axis or pivoted away from the electrical connector.

8. The foldable watch charging adapter of claim 1, further including a magnet coupled to the foldable watch charging adapter; whereby the connection interface adapter may be magnetically retained pivoted away from the electrical connector by the magnet.

9. The foldable watch charging adapter of claim 8, wherein the magnet is proximate the joint.

10. The foldable watch charging adapter of claim 1, wherein the connection interface adapter has a Universal Serial Bus, Type C interface.

11. The foldable watch charging adapter of claim 1, wherein the electrical connector is electrically connected to an electromagnetic interference filter which is electrically connected to a wireless charging integrated circuit which is electrically connected to a coil, the coil provided within the watch charging housing proximate the induction charge surface.

12. The foldable watch charging adapter of claim 1, wherein the connector arm is rotatable with respect to the charge arm to a storage position wherein the connector arm and the charge arm are parallel to one another and the electrical connector is proximate the watch charging housing.

13. The foldable watch charging adapter of claim 12, wherein the connector arm is rotatable to positions 90, 180 and 270 degrees from the storage position.

* * * * *